United States Patent
Horii et al.

(10) Patent No.: US 11,475,345 B2
(45) Date of Patent: Oct. 18, 2022

(54) CONTROLLED NOT GATE PARALLELIZATION IN QUANTUM COMPUTING SIMULATION

(71) Applicant: International Business Machines Corporation, Armonk, NY (US)

(72) Inventors: Hiroshi Horii, Tokyo (JP); Hitomi Chiba, Bunkyo-ku (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 986 days.

(21) Appl. No.: 16/211,446

(22) Filed: Dec. 6, 2018

(65) Prior Publication Data
US 2020/0184361 A1  Jun. 11, 2020

(51) Int. Cl.
| | |
|---|---|
| G06N 10/00 | (2022.01) |
| B82Y 10/00 | (2011.01) |
| G06F 9/30 | (2018.01) |
| G06F 9/455 | (2018.01) |
| G06F 9/50 | (2006.01) |

(52) U.S. Cl.
CPC ............ *G06N 10/00* (2019.01); *B82Y 10/00* (2013.01); *G06F 9/30029* (2013.01); *G06F 9/455* (2013.01); *G06F 9/5016* (2013.01)

(58) Field of Classification Search
None
See application file for complete search history.

(56) References Cited

U.S. PATENT DOCUMENTS

| | | |
|---|---|---|
| 7,596,788 B1 | 9/2009 | Shpigelman |
| 8,972,237 B2 | 3/2015 | Wecker |
| 2014/0039866 A1 | 2/2014 | Wecker |
| 2018/0247217 A1 | 8/2018 | Heeres et al. |

FOREIGN PATENT DOCUMENTS

| | | |
|---|---|---|
| CN | 108154240 A | 6/2018 |
| WO | 2016/0200747 A1 | 12/2016 |

OTHER PUBLICATIONS

"openqasm," Qiskit, Github, 3 pages. https://github.com/Qiskit/openqasm/blob/master/benchmarks/quantum_volume/quantum_volume.py.

Haner et al., "0.5 Petabyte Simulation of a 45-Qubit Quantum Circuit," 2017, Proceedings of the International Conference for High Performance Computing, Networking, Storage and Analysis, ACM, 10 pages.

(Continued)

*Primary Examiner* — Syed A Roni
(74) *Attorney, Agent, or Firm* — Amin, Turocy & Watson, LLP

(57) ABSTRACT

Techniques facilitating controlled NOT gate parallelization in quantum computing simulation are provided. A system can comprise a memory that stores computer executable components and a processor that executes the computer executable components stored in the memory. The computer executable components can comprise a selector component that can select a first qubit and a second qubit. The first qubit can be a control qubit. The computer executable components can also comprise a parallelization component that can reorder the first qubit with the second qubit and a replication component that can simulate a controlled NOT gate during the reordering by the parallelization component.

16 Claims, 10 Drawing Sheets

(56) References Cited

OTHER PUBLICATIONS

Smelyanskiy et al., "qHiPSTER: The Quantum High Performance Software Testing Environment," 2016, arXiv:1601.07195v2 [quant-ph], 9 pages.
International Search Report and Written Opinion received for PCT Application Serial No. PCT/EP2019/082191 dated Feb. 17, 2020, 15 pages.
Jones et al., "QuEST and High Performance Simulation of Quantum Computers", arxiv.org, Cornell University Library, 201 Olin Library Cornell University Ithaca, Dec. 4, 2018, 9 pages.
Haner et al., "High Performance Emulation of Quantum Circuits", XP058308714, Nov. 13, 2016, 9 pages.

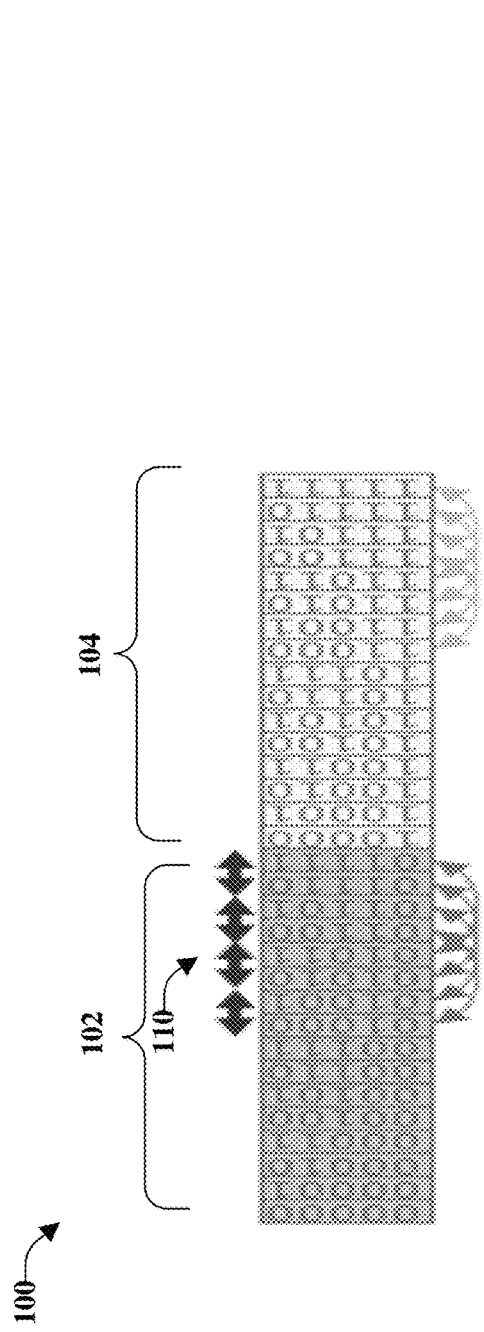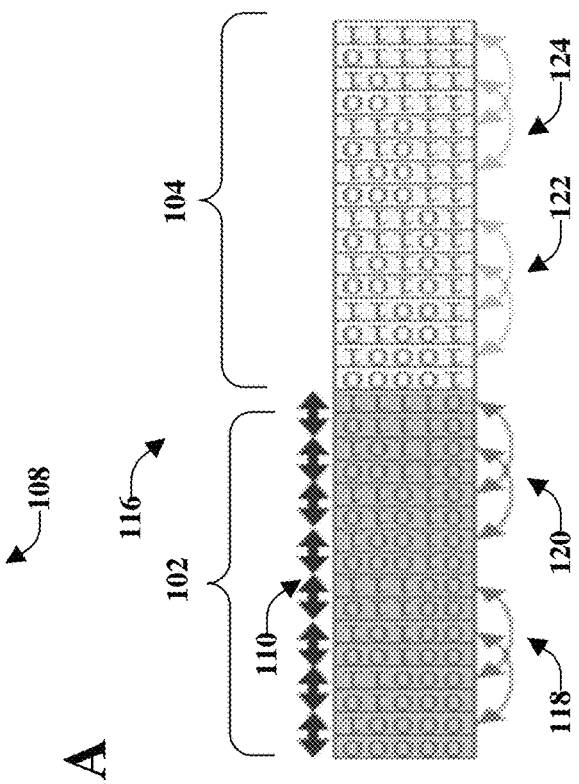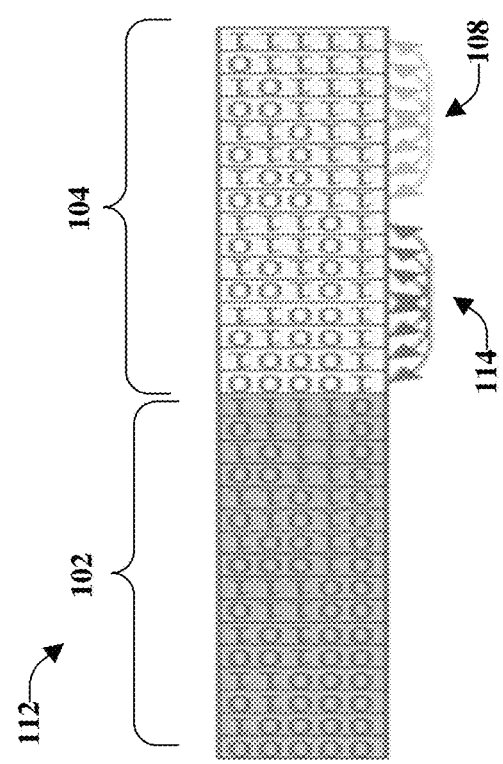
FIG. 1A
FIG. 1B
FIG. 1C

CONTROLLED NOT GATE PARALLELIZATION IN QUANTUM COMPUTING SIMULATION

BACKGROUND

Simulation of quantum computations can be challenging to directly simulate due to the size of the quantum computing systems, even with the use of powerful computers. For example, Smelyanskiyl et al. discusses "implementation of a quantum simulator on a classical computer, that can simulate general single qubit gates and two-qubit controlled gates." See Smelyanskiyl et al., "qHiPSTER: The Quantum High Performance Software Testing Environment," 2016, arXiv:1601.07195v2 [quant-ph], Abstract. Further, Smelyanskiyl et al. discusses performance of "a number of single- and multi-node optimizations, including vectorization, multi-threading, cache blocking, as well as overlapping computation with communication." See id.

However, these simulations can be inefficient as it relates to the execution time (e.g., the time needed to perform the simulated computation). These simulations can also be inefficient due to the amount of storage space needed. Accordingly, opportunities exist to improve quantum computing simulations.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses, and/or computer program products that facilitate controlled NOT gate parallelization in quantum computing simulation are provided.

According to an embodiment, a system can comprise a memory that stores computer executable components and a processor that executes the computer executable components stored in the memory. The computer executable components can comprise a replication component that simulates a controlled NOT gate during a qubit-reordering. The computer executable components can also comprise an analysis component that performs memory access balancing based on the controlled NOT gate being simulated by the replication component during the qubit-reordering. Thus, the advantage of mitigating and/or reducing fragmented access of a quantum memory can be provided. Further, another advantage can be that inefficiency of a thread locality can be mitigated and/or reduced.

According to another embodiment, a computer-implemented method can comprise simulating, by a system operatively coupled to a processor, a controlled NOT gate during a qubit-reordering. The computer-implemented method can also comprise performing, by the system, a memory access balancing based on simulating the controlled NOT gate during the qubit-reordering. Thus, the benefits of mitigating and/or reducing inefficient thread locality and/or fragmented access of a quantum memory can be provided.

According to a further embodiment, a computer program product that facilitates quantum computing simulation of a controlled NOT gate is provided herein. The computer program product can comprise a computer readable storage medium having program instructions embodied therewith. The program instructions can be executable by a processor to cause the processor to simulate the controlled NOT gate during a qubit-reordering. The program instructions can also cause the processor to perform memory access balancing based on the controlled NOT gate being simulated during the qubit-reordering. Thus, the advantage of providing mitigation and/or reduction of fragmented access of a quantum memory can be realized. Further, the advantage of providing mitigation and/or reduction of an inefficient thread locality can be realized.

Another embodiment relates to a method that can comprise selecting, by a system operatively coupled to a processor, a first qubit and a second qubit, wherein the first qubit is a control qubit. The method can also comprise reordering, by the system, the first qubit with the second qubit. A controlled NOT gate can be simulated during the reordering. Advantages of such a method include the migration and/or reduction of fragmented access of a quantum memory and/or the mitigation and/or reduction of inefficient thread locality.

Yet another embodiment relates to a computer program product that facilitates improvement of a quantum computing simulation of a controlled NOT gate while avoiding unbalanced memory access of a control qubit, the computer program product comprising a computer readable storage medium having program instructions embodied therewith, the program instructions are executable by a processor to cause the processor to select the control qubit and a non-control qubit, wherein the non-control qubit and the control qubit are different qubits. The program instructions can also cause the processor to reorder the control qubit with the non-control qubit and simulate a controlled NOT gate while the control qubit is reordered with the non-control qubit. An advantage of such a computer program product is that inefficient thread locality and/or fragmented access of a quantum memory can be mitigated and/or reduced.

DESCRIPTION OF THE DRAWINGS

FIG. 1A illustrates a schematic representation of a non-uniform memory access architecture and cache line that comprises a balanced memory access where each thread accesses local memory.

FIG. 1B illustrates a schematic representation of a non-uniform memory access architecture and cache line that comprises an unbalanced memory access due to on inefficient thread locality.

FIG. 1C illustrates a schematic representation of a non-uniform memory access architecture and cache line that comprises an unbalanced memory access due to fragmented access.

DETAILED DESCRIPTION

Figure 2:
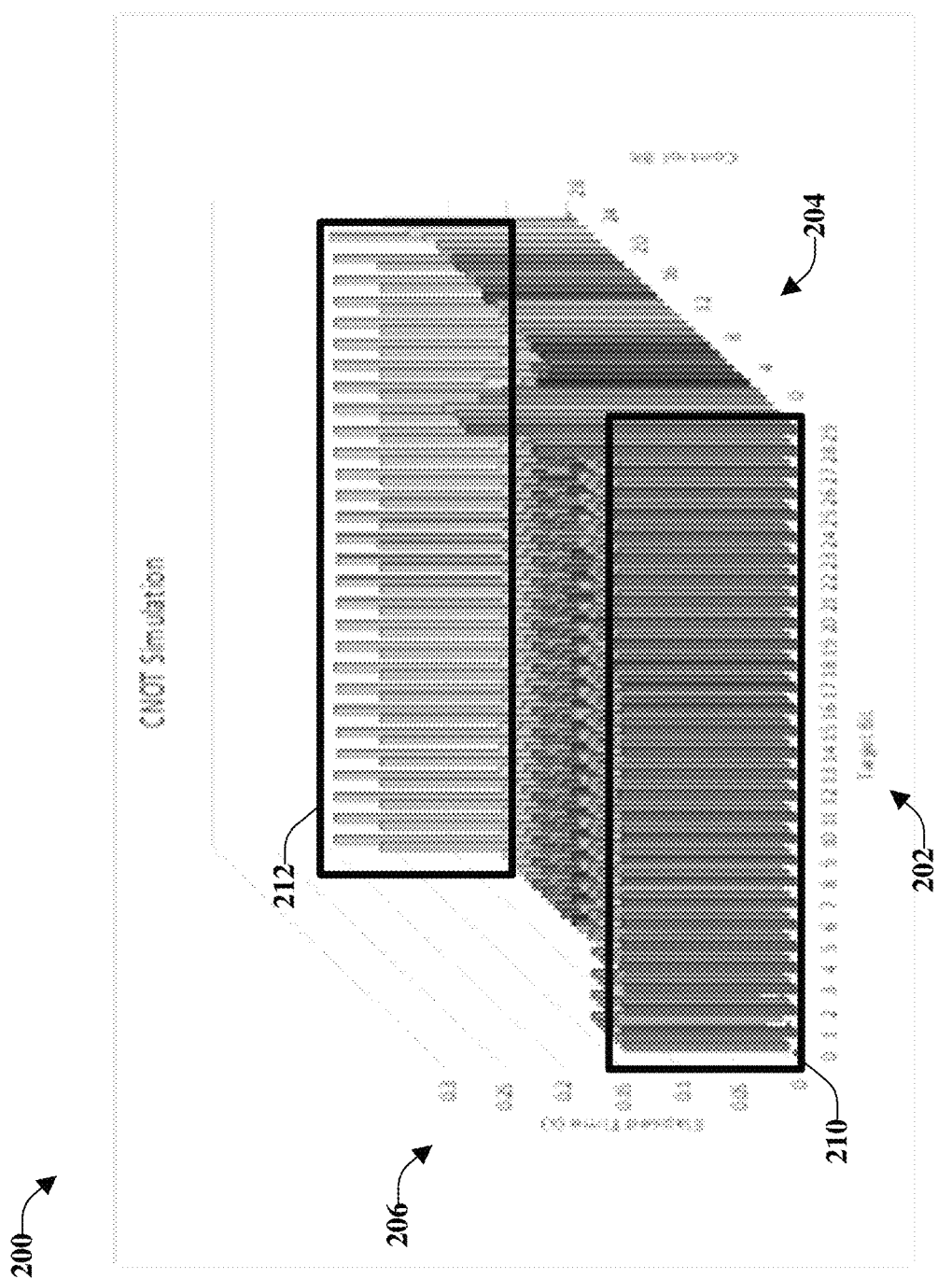
FIG. 2 illustrates a schematic representation of a result of a controlled NOT gate simulation.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In quantum computing, a controlled NOT gate (CNOT or C-NOT) is a quantum gate that can be simulated to various degrees of accuracy using a combination of CNOT gates and single qubit rotations. A quantum gate (or quantum logic gate) is a basic quantum circuit that operates on a small number of qubits. Quantum gates are reversible gates, and are the building blocks of a quantum circuit.

State of q-qubits of a quantum computer is represented by a $2^q$ sized array of complex types. An index of the array is represented with binary format and a probability of 0 of i-th qubit is calculated complex values where i-th bit (an order is from right to left) of an index is 0. For example, a state of 4 qubits is represented with an array of 16 complex values and a probability of 0 of 2nd qubit is calculated with complex values of 0000, 0001, 0100, 0101, 1000, 1001, 1100, and 1101th in the array (all of the 2nd binary is 0 in these indexes).

Quantum gates can be represented by unitary matrices. Various quantum gates can operate on spaces of one or two qubits. The quantum gates can be described by $2^n \times 2^n$ sized unitary matrices. The variables on which the gate acts upon (e.g., quantum states) are vectors in $2^n$ complex dimensions where n is the number of qubits on which the gate acts upon (e.g., the number of qubits of the variable). Controlled gates act on two qubits, where one qubit acts as a control for an operation.

Simulation of the CNOT could produce unbalanced memory accesses from the perspective of a Non-Uniform Memory Access (NUMA) architecture and cache line. For example, an unbalanced memory access could be based on an inefficient thread locality and/or a fragmented access.

In further detail, a CNOT can modify half of the states in quantum computing simulation. A control bit, $q_c$, can determine a modified area. A transfer bit, $q_t$, can determine what states are swapped. By being aware with NUMA architecture, respective threads can frequently access states allocated in its NUMA node. This can be express as the thread has affinity to a NUMA node. A too high $q_c$ and/or a low $q_c$ can cause inefficient memory access in its simulation. For example, if $q_c$ is high, memory access can become unbalanced. In another example, if $q_c$ is low, memory access can become fragmented.

FIG. 1A illustrates a schematic representation 100 of a NUMA architecture and cache line that comprises a balanced memory access where each thread accesses local memory. In this example, memory allocation is between NUMA0 and NUMA1. For the example illustrated, there can be thirty-two states, and this is a five-qubit example. To simulate a quantum computer, an array of complex types can be utilized and, for the example illustrated, there are thirty-two quantum complex values used to represent the five-qubit quantum computer. As illustrated, the first set of boxes 102 (e.g., the first sixteen states illustrated) represent NUMA0 and the second set of boxes 104 (e.g., the second sixteen states illustrated) represent NUMA1. The boxes can comprise respective complex values. For example, the first box has a complex value of 00001.

Thread affinity for NUMA0 is represented by the first set of arrows 106 and thread affinity for NUMA1 is represented by the second set of arrows 108. Further, cache lines are represented by arrows 110.

The CNOT operation can utilize two qubits. For the CNOT operation, half of the states can be swapped, for example. The following equation, can be utilized to swap the qubits, where CX is the CNOT gate, and q is a qubit.

$$\text{CX q[a] q[b]: If a-th bit is 1, swap b-th bit} \qquad \text{Equation 1.}$$

Using the above equation for FIG. 1A results in CX q[3] q[2]. Accordingly, the one or more threads of FIG. 1A access local memory, which comprises balanced memory access.

FIG. 1B illustrates a schematic representation 112 of a NUMA architecture and cache line that comprises an unbalanced memory access due to on inefficient thread locality. Repetitive description of like elements employed in other embodiments described herein is omitted for sake of brevity. Using Equation 1 results in CX q[4] q[2] for FIG. 1B, which creates the problem of an inefficient thread locality. This result is due to $q_c$ being too high (e.g., 4 in this example). In this case, the thread for NUMA0 (e.g., NUMA0 hardware) is always accessing the state of NUMA1, as represented by the first set of arrows 114. A memory value that accesses a remote memory node, as illustrated, takes longer to access the memory than the case where local memory access is being performed (as in FIG. 1A). Accordingly, FIG. 1B has a slow memory access. A solution provided with the various aspects discussed herein is that the qubit-reordering minimizes and/or reduces the inefficiency a thread locality, resulting in a more efficient thread locality.

FIG. 1C illustrates a schematic representation 116 of a NUMA architecture and cache line that comprises an unbalanced memory access due to fragmented access. Repetitive description of like elements employed in other embodiments described herein is omitted for sake of brevity. In the case of FIG. 1C, using Equation 1 results in CX q[0] q[2] as represented by the four sets of arrows, 118-124. In this situation, $q_c$ is too low (e.g., 0 in this example), which causes the problem of fragmented access. A solution provided with the various aspects discussed herein is that the qubit-reordering minimizes and/or reduces fragmented access of a quantum memory.

FIG. 2 illustrates a schematic representation 200 of a result of a controlled NOT gate simulation. Target bits 202 (e.g., 30 target bits numbered 0 to 29) are represented on the X axis, control bits 204 (e.g., 30 control bits numbered 0 to 29) are represented on the Z axis, and elapsed time 206 (in seconds) is represented on the Y axis. The schematic representation is of a 30 qubit simulation having 4 NUMA nodes and 128 bytes cacheline.

Inefficient thread locality, as discussed with respect to FIG. 1B is illustrated within box 208. This problem can be caused based on the 30 control bits being less than or equal to log 2(# NUMA) or 30-Control-bit<=log 2(# NUMA). The disclosed aspects solve the problem of inefficient thread locality by implementing qubit-reordering for quantum computing, to avoid unbalanced memory access while simulating a CNOT gate and while mitigating and/or reducing inefficient thread locality, resulting in a more efficient thread locality.

The problem of fragmented access, as discussed with respect to FIG. 1C is illustrated within box 210. This can be caused based on the control bit being less than log 2(cacheline size) or Control-bit<log 2(cacheline size). The disclosed aspects solve the problem of fragmented access by implementing qubit-reordering for quantum computing, to avoid unbalanced memory access while simulating CNOT gate and while mitigating and/or reducing fragmented access of a quantum memory.

Figure 3:
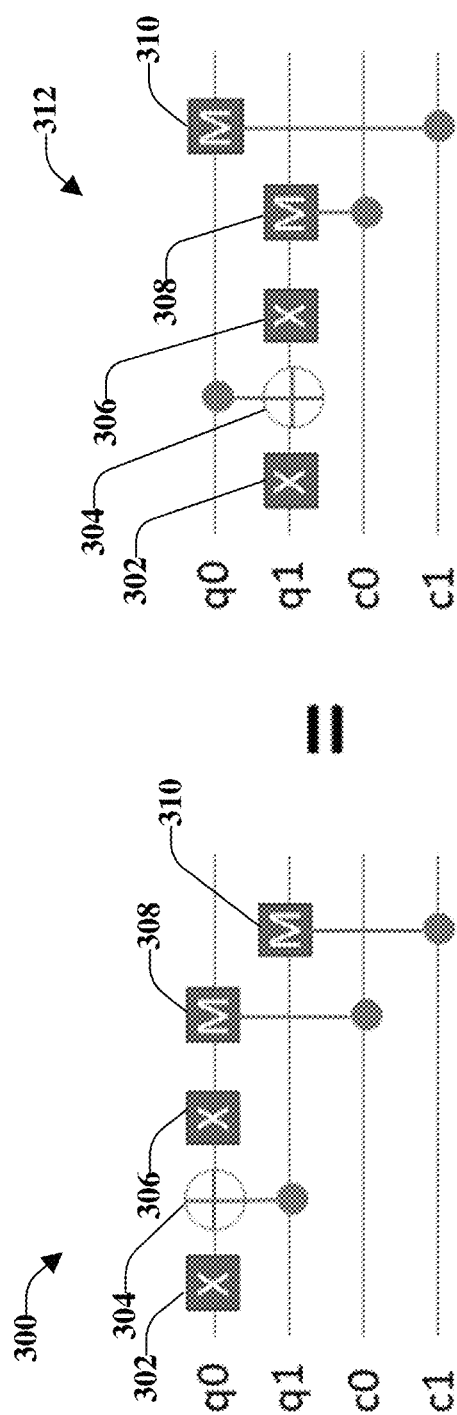
FIG. 3 illustrates a non-limiting bit-reordering example in accordance with one or more embodiments described herein.

The various aspects discussed herein can change the quantum register allocation to minimize fragmented access and inefficient thread locality. For example, FIG. 3 illustrates a non-limiting bit-reordering example in accordance with one or more embodiments described herein. Repetitive description of like elements employed in other embodiments described herein is omitted for sake of brevity.

Illustrated at 300 is a first quantum register allocation. Applied to a first qubit (e.g., bit index 0) can be a first gate, which is a first X-gate 302; a second gate, which is a CNOT gate 304; a third gate, which is a second X-gate 306, and a first measure 308. A second measure 310 can be on a second qubit (e.g., bit index 1). Illustrated at 312 is a second quantum register allocation, which is a reallocation (or a reordering) of the first quantum register allocation. For example, the first qubit and the second qubit can be swapped.

As an example, the following simple algorithm can be utilized for bit reordering. Qubits can be randomly allocated in the register and the number of inefficient memory states can be calculated. The minimum number of inefficient memory access can be determined and qubit reordering can be performed. A determination can be made as to be most efficient qubit reordering. It is noted that although an example algorithm has been descried, other algorithms can be utilized, and the disclosed aspects are not limited to this example.

In quantum computing, when a quantum register is measured, its state (0 or 1) to a classical register. Even if runtime changes allocation of qubits in a quantum circuit, results of the circuits are equivalent by keeping allocation of classical registers. Embodiments described herein comprise systems, computer-implemented methods, and computer program products that can facilitate CNOT parallelization. For example, as discussed herein, bit-reordering can be performed to minimize control-qubits which are equal or higher than (# of qubits)−log 2(# of NUMA nodes). The bit-reordering discussed herein can additionally, or alternatively, be performed to minimize control-qubits that are lower than log 2(# of NUMA nodes).

Figure 4:
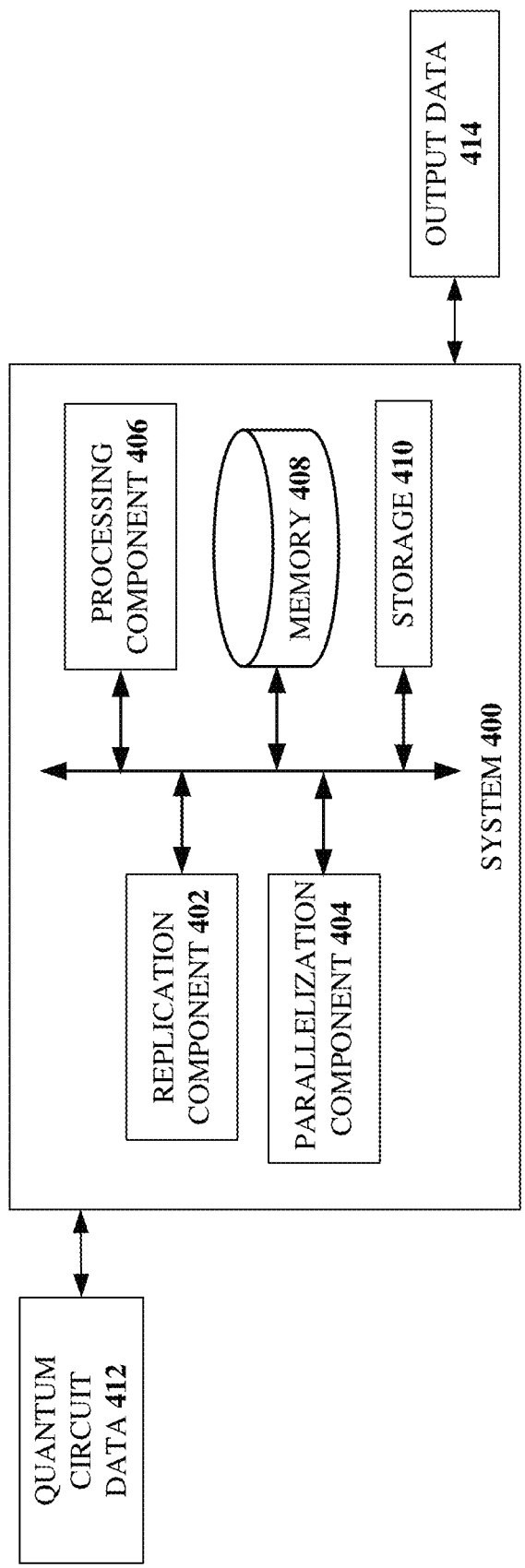
FIG. 4 illustrates a block diagram of an example, non-limiting, system that facilitates controlled NOT gate parallelization in quantum computing simulation in accordance with one or more embodiments described herein.

FIG. 4 illustrates a block diagram of an example, non-limiting, system 400 that facilitates controlled NOT gate parallelization in quantum computing simulation in accordance with one or more embodiments described herein. Aspects of systems (e.g., the system 400 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 400 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 400 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In various embodiments, the system 400 can be a quantum computing system associated with technologies such as, but not limited to, quantum circuit technologies, quantum processor technologies, quantum computing technologies, artificial intelligence technologies, medicine and materials technologies, supply chain and logistics technologies, financial services technologies, and/or other digital technologies. The system 400 can employ hardware and/or software to solve problems that are highly technical in nature, that are not abstract and that cannot be performed as a set of mental acts by a human. Further, in certain embodiments, some of the processes performed can be performed by one or more specialized computers (e.g., one or more specialized processing units, a specialized computer with a quantum computing component, etc.) to carry out defined tasks related to machine learning.

The system 400 and/or components of the system 400 can be employed to solve new problems that arise through advancements in technologies mentioned above, computer architecture, and/or the like. One or more embodiments of the system 400 can provide technical improvements to quantum computing systems, quantum circuit systems, quantum processor systems, artificial intelligence systems, and/or other systems. One or more embodiments of the system 400 can also provide technical improvements to a quantum processor (e.g., a superconducting quantum processor) by improving processing performance of the quantum processor, improving processing efficiency of the quantum processor, improving processing characteristics of the quantum processor, improving timing characteristics of the quantum processor, and/or improving power efficiency of the quantum processor.

In the embodiment shown in FIG. 4, the system 400 can comprise a replication component 402, a parallelization component 404, a processing component 406, a memory 408, and/or a storage 410. The memory 408 can store computer executable components and instructions. The processing component 406 (e.g., a processor) can facilitate execution of the instructions (e.g., computer executable components and corresponding instructions) by the replication component 402, the parallelization component 404, and/or other system components. As shown, in some embodiments, one or more of the replication component 402, the parallelization component 404, the processing component 406, the memory 408, and/or the storage 410 can be electrically, communicatively, and/or operatively coupled to one another to perform one or more functions of the system 400.

The replication component 402 can receive, as input data, quantum circuit data 412. For example, the quantum circuit data 412 can be a machine-readable description of a quantum circuit. The quantum circuit can be a model for one or more quantum computations associated with a sequence of quantum gates. In one example, the quantum circuit data can include textual data indicative of a text-format language (e.g., a QASM text-format language) that describes a quantum circuit. For instance, the textual data can, for example, textually describe one or more qubit gates of a quantum circuit associated with one or more qubits.

Based, at least in part, on the input data (e.g., the quantum circuit data 412), the replication component 402 can simulate a controlled NOT gate (e.g., the CNOT gate 304) during a qubit-reordering. Further, the parallelization component 404 can perform memory access balancing based on the controlled NOT gate being simulated by the replication component 402 during the qubit-reordering. The parallelization component 404 can output, as output data 414, a result of the memory access balancing. According to some implementations, the parallelization component 404 can perform the memory access balancing to reduce and/or minimize a fragmented access of a quantum memory (as discussed with respect to FIG. 1C and FIG. 2). In additional, or alternative, implementations, the parallelization component 404 can perform the memory access balancing to reduce an/or minimize an inefficient thread locality (as discussed with respect to FIG. 1B and FIG. 2).

In certain embodiments, the parallelization component 404 can perform the memory access balancing and can generate the output data 414 based on classifications, correlations, inferences and/or expressions associated with principles of artificial intelligence. For instance, the parallelization component 404, as well as other system components, can employ an automatic classification system and/or an automatic classification process to determine which qubit to select as a control bit, which qubit to select as a target bit, when to select one or more other bits as the control bit and/or the target bit, whether the memory access balancing was successful and so on. In one example, the parallelization component 404 can employ a probabilistic and/or statistical-based analysis (e.g., factoring into the analysis utilities and costs) to learn and/or generate inferences with respect to selection of the one or more qubits and corresponding balancing that should be applied to the one or more qubits. In an aspect, the parallelization component 404 can comprise an inference component (not shown) that can further enhance automated aspects of the parallelization component 404 utilizing in part inference-based schemes to facilitate learning and/or generating inferences associated with the selection of qubits and/or a result of the memory access balancing in order to achieve reduced and/or minimized fragmented access of a quantum memory and/or reduced and/or minimized thread locality.

The parallelization component 404 can employ any suitable machine-learning based techniques, statistical-based techniques, and/or probabilistic-based techniques. For example, the parallelization component 404 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the parallelization component 404 can perform a set of machine learning computations associated with qubit selection and/or memory access balancing. For example, the parallelization component 404 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to determine a manner of memory access balancing and/or a result of the memory access balancing.

It is to be appreciated that the system 400 (e.g., the replication component 402 and/or the parallelization component 404, as well as other system components) performs a qubit selection, a memory access balancing (or rebalancing) and/or generates a result of the memory access balancing at substantially the same time as the replication component 402 simulates a controlled NOT gate during a qubit-reordering, which cannot be performed by a human (e.g., is greater than the capability of a single human mind). For example, an amount of data processed, a speed of data processed, and/or data types of data processed by the system 400 (e.g., the replication component 402 and/or the parallelization component 404) over a certain period of time can be greater, faster, and different than an amount, speed, and data type that can be processed by a single human mind over the same period of time. The system 400 (e.g., the replication component 402 and/or the parallelization component 404) can also be fully operational towards performing one or more other functions (e.g., fully powered on, fully executed, etc.) while also performing the above-referenced quantum circuit analysis and/or pulse signal generation process. Moreover, output data 414 generated and coordinated by the system 400 (e.g., the replication component 402 and/or the parallelization component 404) can include information that is impossible to obtain manually by a user. For example, a type of information included in the quantum circuit data 412, a variety of information associated with the quantum circuit data 412, and/or optimization of the quantum circuit data 412 utilized to facilitate the memory access balancing and/or to generate and output the output data 414 can be more complex than information that can be obtained manually and processed by a user.

Figure 5:
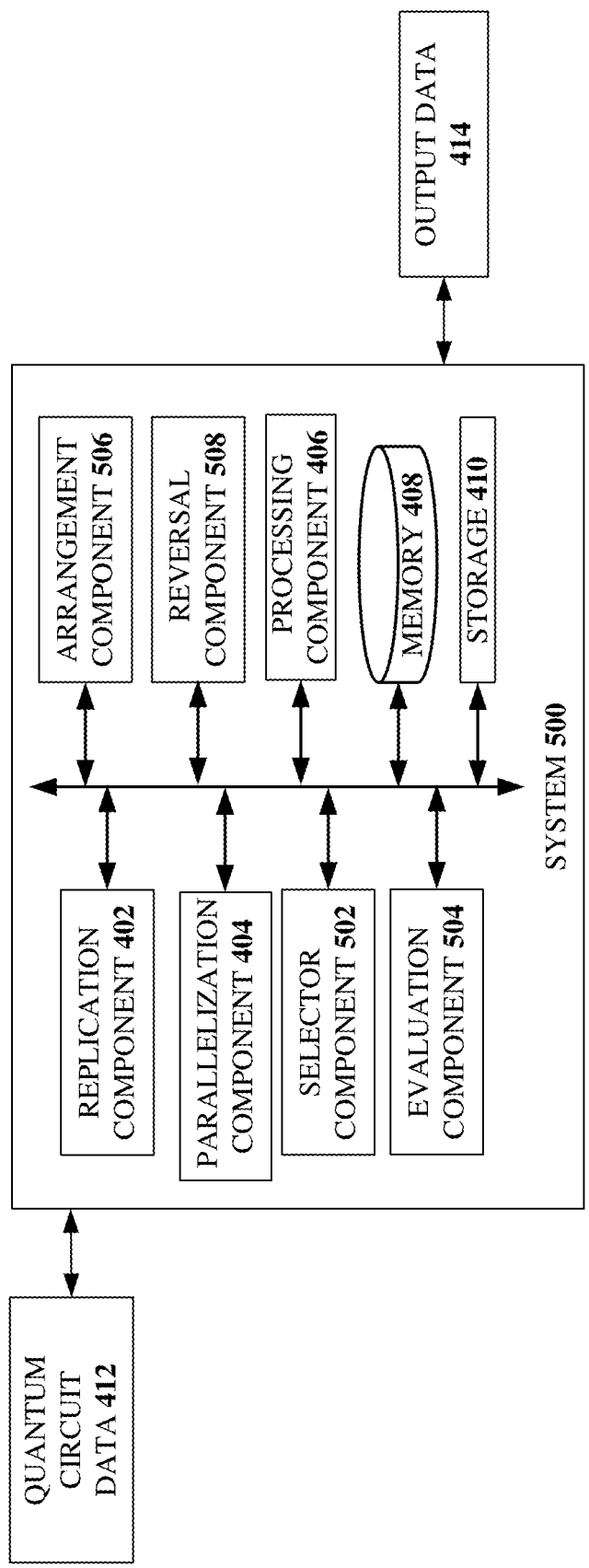
FIG. 5 illustrates a block diagram of an example, non-limiting, system that implements selection of qubits for memory access balancing in accordance with one or more embodiments described herein.

FIG. 5 illustrates a block diagram of an example, non-limiting, system 500 that implements selection of qubits for memory access balancing in accordance with one or more embodiments described herein. Repetitive description of like elements employed in other embodiments described herein is omitted for sake of brevity.

The system 500 can comprise one or more of the components and/or functionality of the system 400, and vice versa. The various aspects discussed herein can be utilized to improve quantum computing simulation of a CNOT gate to avoid (e.g., mitigate and/or reduce) unbalanced memory access of a $q_c$ (control qbit or qubit) and to improve cache hits of $q_t$ (target qbit) in a computer system having N number of NUMA-nodes.

The system 500 can comprise a selector component 502 that can select a first bit and a second bit for the qubit-reordering. The first bit can be a control bit. In an example, the selector component 502 can select the first bit based on a determination that the first bit is a bit that is equal to or higher than a sum comprising a number of qubits less a binary logarithm (log 2) of a number of non-uniform memory access nodes. In another example, the selector component 502 can select the first bit based on a determination that the first bit is a bit that is less a binary logarithm (log 2) of a number of non-uniform memory access nodes. In yet another example, the selector component 502 can select the second bit based on a determination that the second bit is different from the first bit and is not a target bit with the first bit as the control bit. The selector component 502 can also select other qubits.

The system 500 can also comprise an evaluation component 504 that can determine whether the memory access balancing performed by the parallelization component 404 was successful or was not successful. Thus, the evaluation component 504 can determine whether there was a memory access improvement, or whether there was a lack of memory access improvement. For example, the evaluation component 504 can analyze the memory access balancing to determine if a reduction and/or minimization of control qubits which are equal to or higher than a sum comprising a number of qubits less a first binary logarithm (log 2) of a number of non-uniform memory access nodes was achieved. In another example, the evaluation component 504 can analyze the memory access balancing to determine if a reduction and/or minimization of control qubits, which are less than a second binary logarithm (log 2) of the number of non-uniform memory access nodes was achieved.

Also included in the system 500 can be an arrangement component 506 that can implement the qubit-reordering for quantum computing, wherein the arrangement component 506 can reorder a first bit with a second bit. Further, based on a determination by the evaluation component 504 that the qubit reordering and/or memory access balancing was successful (e.g., the above results were achieved), the arrangement component 506 can reorder the first bit and/or the second bit with a third bit (and/or subsequent bits). For example, the evaluation component 504 (or another system component) can determine that there are more qubits that should be reordered and, thus, the third bit (and/or subsequent bits) can be reordered, as discussed herein, until there are no additional qubits that should be reordered, as determined by the evaluation component 504 (or another system component).

Further, based on the evaluation component 504 determining there was a memory access improvement, the selector component 502 can select another qubit as the control qubit or as the target qubit. The parallelization component 404 can perform another memory access balancing based on the CNOT gate being simulated by the replication component 402 during a second (or subsequent) qubit-reordering.

If the determination by the evaluation component 504 is that the qubit reordering and/or memory access balancing was not successful (e.g., the above results were not achieved), a reversal component 508 can revert the (most recent) qubit-reordering.

Further, based on the evaluation component 504 determining there was a lack of memory access improvement, the selector component 502 can select another qubit as the control qubit or as the target qubit. The parallelization component 404 can perform another memory access balancing based on the CNOT gate being simulated by the replication component 402 during a second (or subsequent) qubit-reordering. As discussed above, the evaluation component 504 (or another system component) can determine that there are more qubits that should be reordered and, thus, the third bit (and/or subsequent bits) can be reordered, as discussed herein, until there are no additional qubits that should be reordered, as determined by the evaluation component 504 (or another system component).

Figure 6:
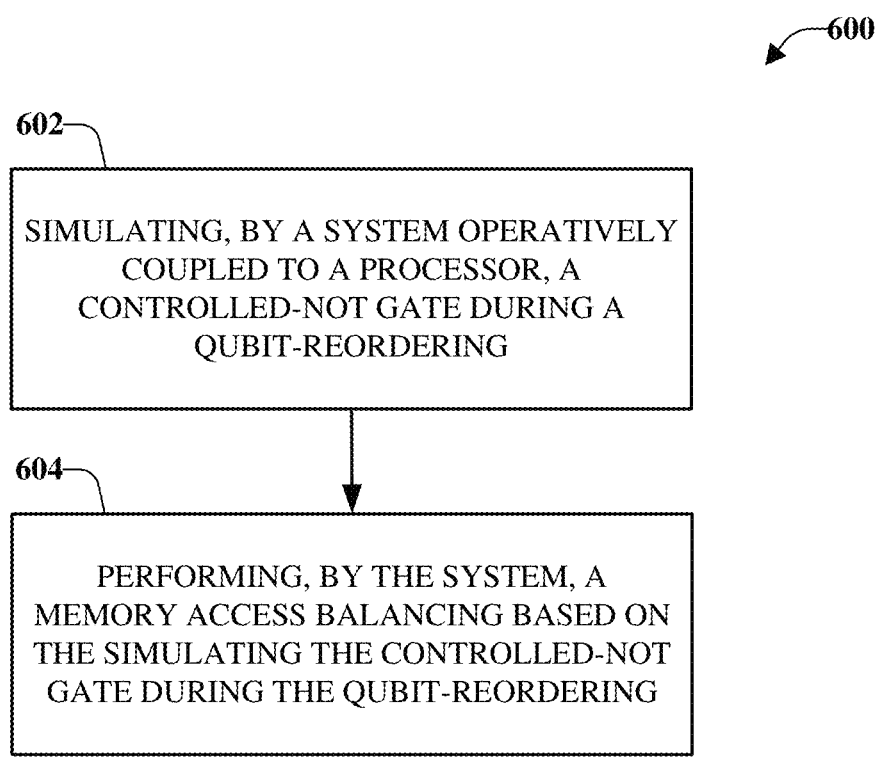
FIG. 6 illustrates a flow diagram of an example, non-limiting, computer-implemented method that facilitates controlled NOT gate parallelization in quantum computing simulation in accordance with one or more embodiments described herein.

FIG. 6 illustrates a flow diagram of an example, non-limiting, computer-implemented method 600 that facilitates controlled NOT gate parallelization in quantum computing simulation in accordance with one or more embodiments described herein. Repetitive description of like elements employed in other embodiments described herein is omitted for sake of brevity.

At 602 of the computer-implemented method 600, a system operatively coupled to a processor can simulate a controlled NOT gate during a qubit-reordering (e.g., via the replication component 402). Further, at 604 of the computer-implemented method 600, the system can perform a memory access balancing based on the simulating the controlled NOT gate during the qubit-reordering (e.g., via the parallelization component 404). According to some implementations, the memory access balancing can minimize fragmented access of a quantum memory. In accordance with additional, or alternative, implementations, the memory access balancing can minimize a thread locality.

Figure 7:
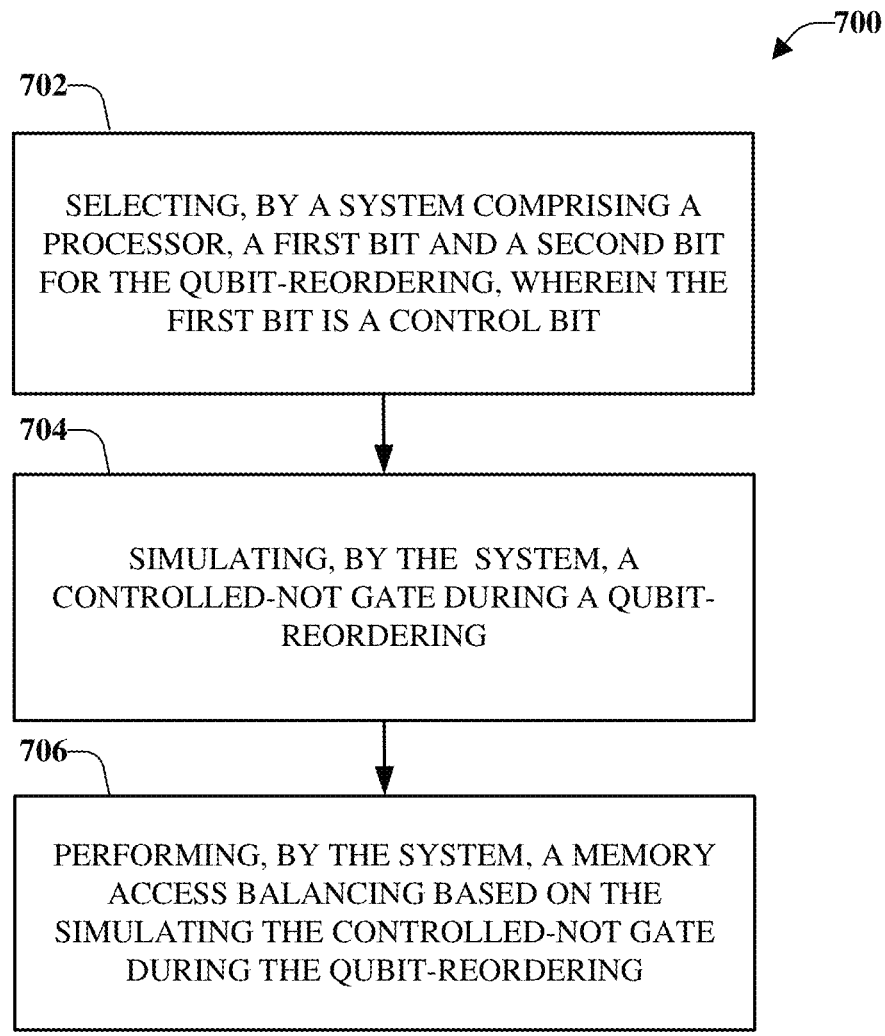
FIG. 7 illustrates a flow diagram of an example, non-limiting, computer-implemented method that facilitates selecting one or more bits to facilitate qubit-reordering in accordance with one or more embodiments described herein.

FIG. 7 illustrates a flow diagram of an example, non-limiting, computer-implemented method 700 that facilitates selecting one or more bits to facilitate qubit-reordering in accordance with one or more embodiments described herein. Repetitive description of like elements employed in other embodiments described herein is omitted for sake of brevity.

The computer-implemented method 700 begins, at 702, when a system comprising a processor can select a first bit and at least a second bit (e.g., via the selector component 502). The first bit and at least the second bit can be selected for qubit-reordering and the first bit can be a control bit according to various implementations.

In an example, selection of the first bit can be based on a determination that the first bit is a bit that is equal to or higher than a sum comprising a number of qubits less a binary logarithm (log 2) of a number of non-uniform memory access nodes. In another example, selection of the first bit can be based on a determination that the first bit is a bit that is less a binary logarithm (log 2) of a number of non-uniform memory access nodes. In a further example, selection of the first bit can be based on a determination that the second bit is different from the first bit and is not a target bit with the first bit as the control bit.

The computer-implemented method 700 continues, at 704, when the system can simulate a controlled NOT gate during a qubit reordering (e.g., via the replication component 402). Further, at 706 of the computer-implemented method 700, the system can perform a memory access balancing (e.g., via the parallelization component 404). During the memory access balancing, the controlled NOT gate can be simulated.

Figure 8:
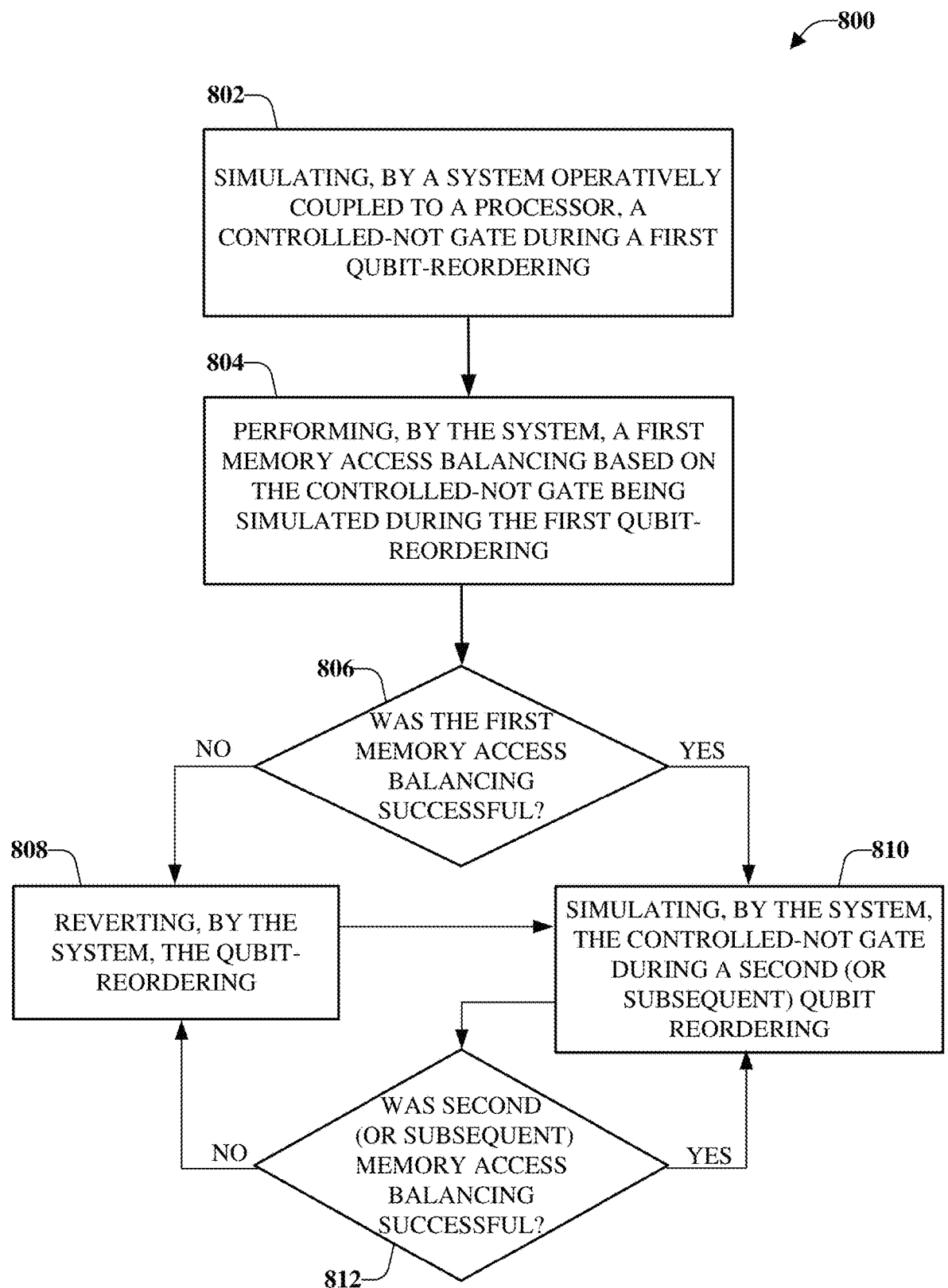
FIG. 8 illustrates a flow diagram of an example, non-limiting, computer-implemented method that facilitates evaluation of a memory access balancing attempt in accordance with one or more embodiments described herein.

FIG. 8 illustrates a flow diagram of an example, non-limiting, computer-implemented method 800 that facilitates evaluation of a memory access balancing attempt in accordance with one or more embodiments described herein.

Repetitive description of like elements employed in other embodiments described herein is omitted for sake of brevity.

The computer-implemented method 800 starts, at 802, when a system operatively coupled to a processor simulates a controlled NOT gate during a first qubit-reordering (e.g., via the replication component 402). Further, at 804, the system can perform a first memory access balancing based on the simulating the controlled NOT gate during the first qubit-reordering (e.g., via the parallelization component 404).

A determination can be made, at 806 of the computer-implemented method 800, whether the first memory access balancing was successful (e.g., via the evaluation component 504). If the determination is that the first memory access balancing was not successful ("NO"), at 808 the system can revert the first qubit-reordering (e.g., via the reversal component 508). If the determination is that the first memory access balancing was successful ("YES"), or after the reversion at 806, the computer-implemented method 800 can continue, at 810, and the system can simulate the controlled NOT gate during a second qubit reordering (e.g., via the parallelization component 404).

The computer-implemented method 800 can continue, at 812, with a determination whether the second memory access balancing was successful (e.g., via the evaluation component 504). If not successful ("NO"), the computer-implemented method 800 can return to 806 and can revert the second qubit-reordering (e.g., via the reversal component 508). If successful ("YES"), or after the reversion of the second qubit-reordering, and based on there being further qubits to reorder, the computer-implemented method 800 can continue, at 810 and the controlled NOT gate can be simulated during a subsequent qubit reordering (e.g., via the parallelization component 404). The determination at 812, the reversion at 806, and/or the simulation at 810, can continue until a determination is made that there are no further qubits that need to be reordered according to various implementations.

Figure 9:
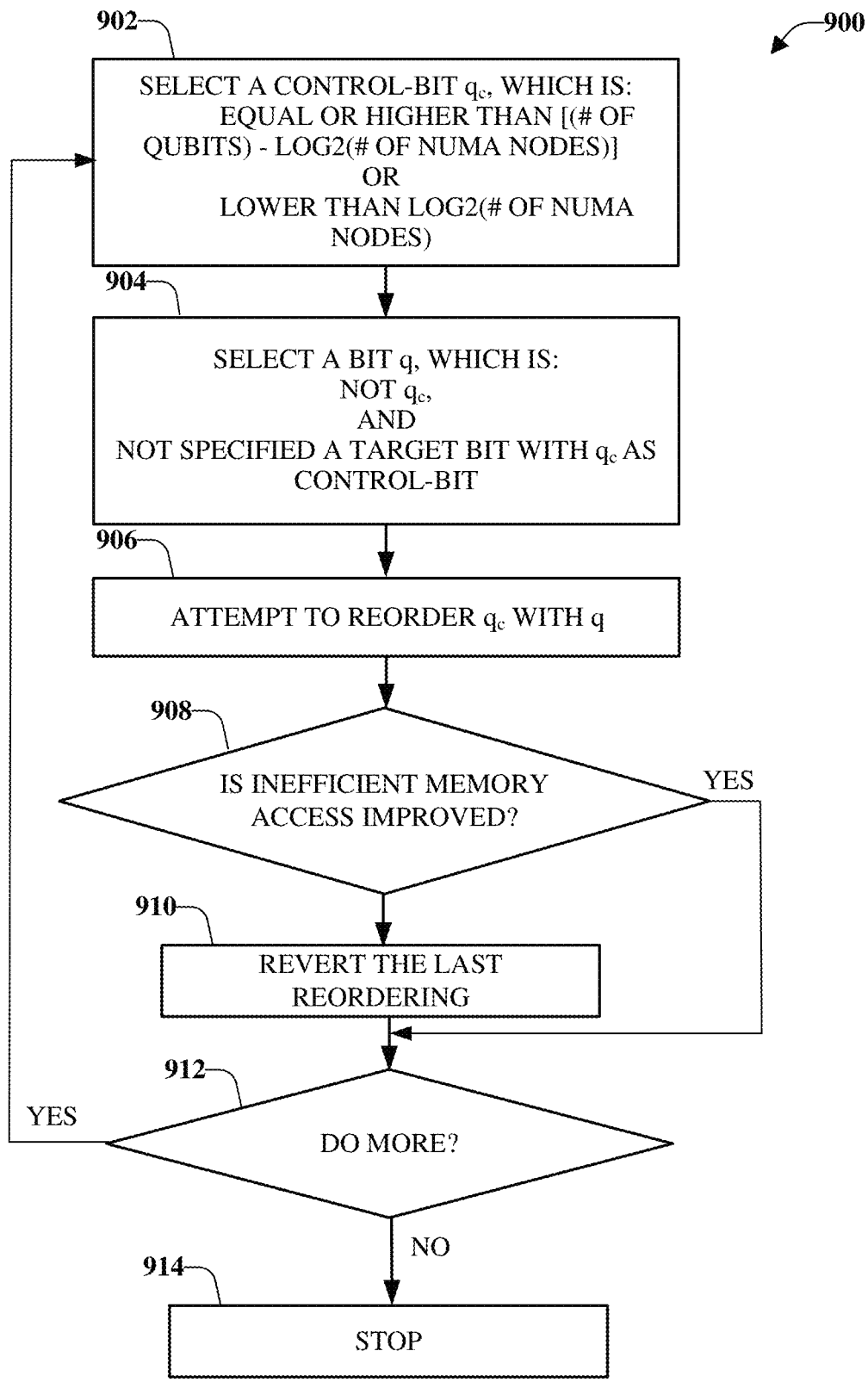
FIG. 9 illustrates a flow diagram of an example, non-limiting, computer-implemented method that facilitates controlled NOT gate parallelization in quantum computing simulation in accordance with one or more embodiments described herein.

FIG. 9 illustrates a flow diagram of an example, non-limiting, computer-implemented method 900 that facilitates controlled NOT gate parallelization in quantum computing simulation in accordance with one or more embodiments described herein. Repetitive description of like elements employed in other embodiments described herein is omitted for sake of brevity.

The computer-implemented method 900 starts, at 902, when a system comprising a processor can select a first bit, which can be a control-bit $q_c$ (e.g., via the selector component 502). The selection of the first bit can be based on a determination that a bit of a plurality of bits comprises a value that is equal or higher than [(# of qubits)–log 2(# of NUMA nodes)]. Alternatively, the selection of the first bit can be based on a determination that a bit of a plurality of bits comprises a value that is lower than log 2(# of NUMA nodes).

At 904 of the computer-implemented method 900, the system can select a second bit, which can be bit $q$, (e.g., via the selector component 502). The selection of the second bit can be based on a determination that a bit of the plurality of bits is not the first bit (e.g., is not the control bit $q_c$, is bit different from the control bit $q_c$) and that the bit is not specified as a target bit with $q_c$ as the control-bit.

At 906 of the computer-implemented method 900, an attempt can be made, by the system, to reorder the first bit with the second bit (e.g., reorder the control bit $q_c$ with bit $q$) (e.g., via the parallelization component 404). Further, at 908 of the computer-implemented method 900, a determination can be made whether memory access has been improved (e.g., via the evaluation component 504). For example, the determination at 908 can be whether an inefficient memory access has been improved (e.g., the inefficiency has been improved).

If the determination is that the inefficiency has not been improved ("NO"), the computer-implemented method 900 can continue, at 910 and the last reordering can be reverted (e.g., via the reversal component 508). For example, the last reordering can be reversed to the previous reordering. Upon or after the reversion of the last reordering, or if the determination at 908 is that the inefficiency has been improved ("YES"), the computer-implemented method 900 can continue, at 912, with a determination whether additional reordering should be implemented (e.g., via the evaluation component 504). For example, the determination to perform additional reordering can be based on whether there are additional bits that can be reordered.

If additional reordering is not to be performed ("NO"), the computer-implemented method 900 can stop, at 914. However, if additional reordering should be performed ("YES"), the computer-implemented method can continue, at 902, with selection of the first bit (e.g., the control bit can be reused). However, in some implementations, the selection at 902 can be of another bit that can be utilized as the control bit. It is to be understood that the determination of performing another (or subsequent) reordering at 912 can be recursive. For example, after selection of a control bit (e.g., a first bit) and another bit (e.g., the second bit or a subsequent bit), reordering can be performed, and a determination can be made whether another reordering should be performed.

As discussed herein, provided can be a system, computer-implemented method, computer program product, or other embodiment that can facilitate quantum computing simulation of a controlled NOT gate. For example, a computer program product can comprise a computer readable storage medium having program instructions embodied therewith, the program instructions are executable by a processor to cause the processor to simulate the controlled NOT gate during a qubit-reordering and perform memory access balancing based on the controlled NOT gate being simulated during the qubit-reordering.

In an example, the program instructions can cause the processor to select a first bit based on based on a determination that the first bit is a bit that is equal to or higher than a sum comprising a number of qubits less a first binary logarithm (log 2) of a number of non-uniform memory access nodes, wherein the first bit is a control bit. Alternatively, the program instructions can cause the processor to select a first bit based on a determination that the first bit is a bit that is less than a second binary logarithm (log 2) of the number of non-uniform memory access nodes. According to some implementations, the program instructions can cause the processor to select a second bit based on a determination that the second bit is different from the first bit and is not a target bit with the first bit as the control bit.

Further, as discussed herein, provided can be a system, computer-implemented method, computer program product, or other embodiment that can facilitate improvement of a quantum computing simulation of a controlled NOT gate while avoiding unbalanced memory access of a control qubit. For example, a computer program product can comprise a computer readable storage medium having program instructions embodied therewith, the program instructions are executable by a processor to cause the processor to select the control qubit and a non-control qubit, wherein the non-control qubit and the control qubit are different qubits, reorder the control qubit with the non-control qubit, and simulate a controlled NOT gate while the control qubit is reordered with the non-control qubit.

In an example implementation, the program instructions can cause the processor to reduce control qubits that are equal to or higher than a first quantity of qubits minus a first binary logarithm (log 2) of a second quantity of non-uniform memory access nodes. According to another example implementation, the program instructions can cause the processor to reduce control qubits that are lower than a second binary logarithm (log 2) of a quantity of non-uniform memory access nodes.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
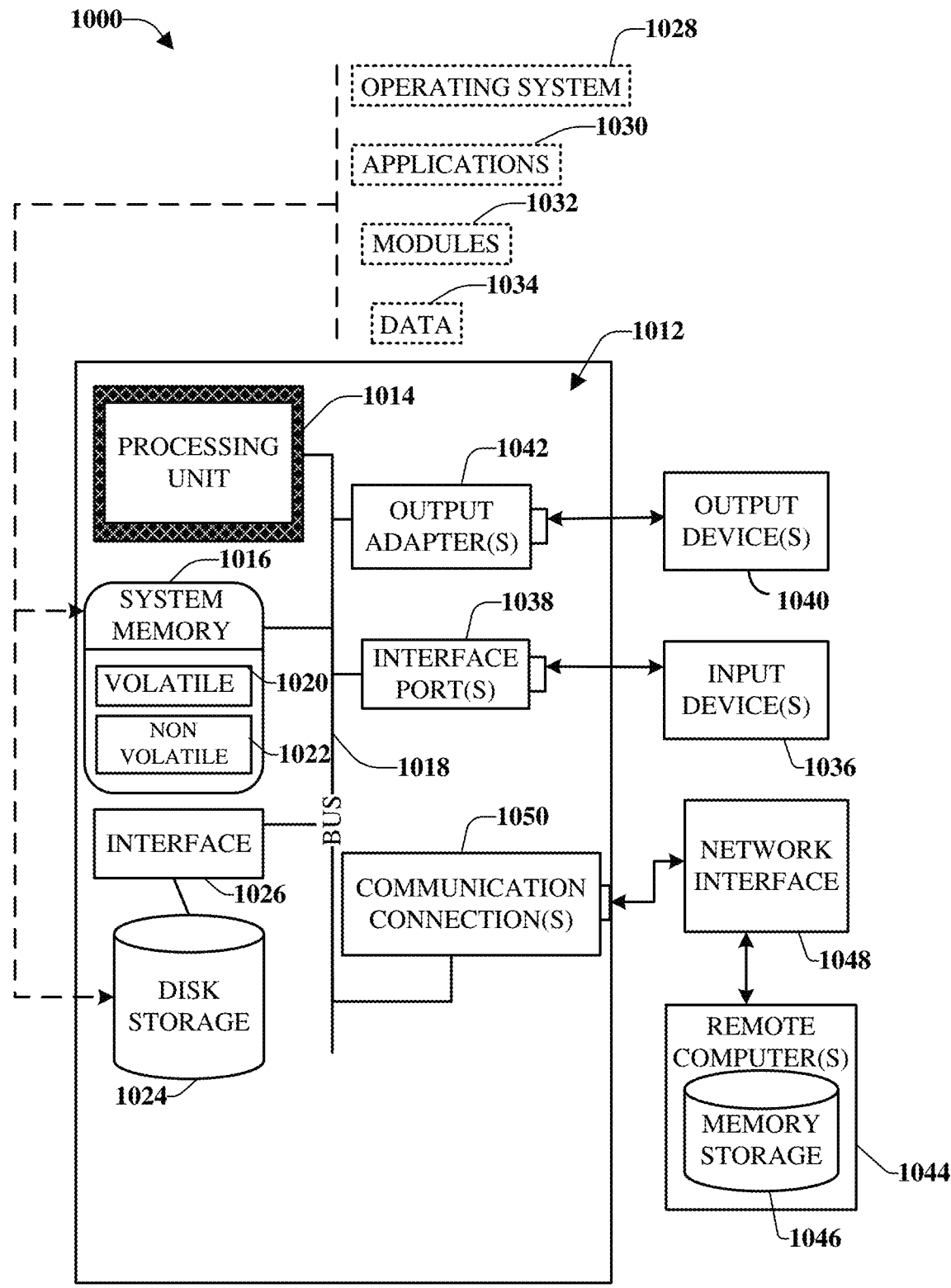
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), Video Electronics Standards Association (VESA) Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include Read Only Memory (ROM), Programmable ROM (PROM), Electrically Programmable ROM (EPROM), Electrically Erasable Programmable ROM (EEPROM), flash memory, or nonvolatile Random Access Memory (RAM) (e.g., Ferroelectric RAM (FeRAM)). Volatile memory 1020 can also include RAM, which acts as external cache memory. By way of illustration and not limitation, RAM is available in many forms such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile RAM (e.g., FeRAM. Volatile memory can include RAM, which can act as external cache memory, for example. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a replication component that simulates a controlled NOT gate during a qubit-reordering;
        a parallelization component that performs memory access balancing based on the controlled NOT gate being simulated by the replication component during the qubit-reordering; and
        a selector component that selects a first bit and a second bit for the qubit-reordering, wherein the first bit is a control bit and wherein the selector component selects the first bit based on:
            a determination that the first bit is a bit that is equal to or higher than a sum comprising a number of qubits less a binary logarithm (log2) of a number of non-uniform memory access nodes; or
            a determination that the first bit is a bit that is less a binary logarithm (log2) of a number of non-uniform memory access nodes; or
            a determination that the second bit is different from the first bit and is not a target bit with the first bit as the control bit.

2. The system of claim 1, wherein the computer executable components further comprise:
    an arrangement component that implements the qubit-reordering for quantum computing, wherein the arrangement component reorders a first bit with a second bit.

3. The system of claim 1, wherein the computer executable components further comprise:
    a reversal component that reverts the qubit-reordering based on an evaluation component determining a lack of memory access improvement.

4. The system of claim 1, wherein the qubit-reordering minimizes fragmented access of a quantum memory.

5. The system of claim 1, wherein the qubit-reordering minimizes a thread locality.

6. The system of claim 1, wherein the qubit-reordering is a first qubit-reordering, and wherein the replication component simulates the controlled NOT gate during a second qubit reordering based on a determination by an evaluation component that the memory access balancing was successful.

7. A computer-implemented method, comprising:
    simulating, by a system operatively coupled to a processor, a controlled NOT gate during a qubit-reordering;
    performing, by the system, a memory access balancing based on the simulating the controlled NOT gate during the qubit-reordering; and
    selecting, by the system, a first bit and a second bit for the qubit-reordering, wherein the first bit is a control bit, and wherein the selecting comprises:
        selecting the first bit based on a determination that the first bit is a bit that is equal to or higher than a sum comprising a number of qubits less a binary logarithm (log2) of a number of non-uniform memory access nodes; or
        selecting the first bit based on a determination that the first bit is a bit that is less a binary logarithm (log2) of a number of non-uniform memory access nodes; or
        selecting the second bit comprises selecting the second bit based on a determination that the second bit is different from the first bit and is not a target bit with the first bit as the control bit.

8. The computer-implemented method of claim 7, wherein the selecting the first bit comprises selecting the first bit based on a determination that the first bit is a bit that is equal to or higher than a sum comprising a number of qubits less a binary logarithm (log2) of a number of non-uniform memory access nodes.

9. The computer-implemented method of claim 7, wherein the selecting the first bit comprises selecting the first bit based on a determination that the first bit is a bit that is less a binary logarithm (log2) of a number of non-uniform memory access nodes.

10. The computer-implemented method of claim 7, wherein the selecting the second bit comprises selecting the second bit based on a determination that the second bit is different from the first bit and is not a target bit with the first bit as the control bit.

11. The computer-implemented method of claim 7, further comprising reverting, by the system, the qubit-reordering based on a determination of a lack of memory access improvement.

12. The computer-implemented method of claim 7, wherein the qubit-reordering is a first qubit-reordering, and wherein the computer-implemented method further comprises:
    determining, by the system, that the memory access balancing was successful; and
    simulating, by the system, the controlled NOT gate during a second qubit reordering based on the determining.

13. A computer program product that facilitates quantum computing simulation of a controlled NOT gate, the computer program product comprising a computer readable storage medium having program instructions embodied therewith, the program instructions are executable by a processor to cause the processor to:

simulate the controlled NOT gate during a qubit-reordering; perform memory access balancing based on the controlled NOT gate being simulated during the qubit-reordering; and select a first bit based on a determination that:

the first bit is a bit that is equal to or higher than a sum comprising a number of qubits less a first binary logarithm (log2) of a number of non-uniform memory access nodes, wherein the first bit is a control bit, or the first bit is a bit that is less than a second binary logarithm (log2) of the number of non-uniform memory access nodes.

14. The computer program product of claim 13, wherein the program instructions cause the processor to select a second bit based on a determination that the second bit is different from the first bit and is not a target bit with the first bit as the control bit.

15. A method, comprising:

selecting, by a system operatively coupled to a processor, a first qubit and a second qubit, wherein the first qubit is a control qubit; and reordering, by the system, the first qubit with the second qubit, wherein a controlled NOT gate is simulated during the reordering, wherein the reordering the first qubit with the second qubit comprises minimizing, by the system, an occurrence of one or more control qubits that are equal to or higher than a first quantity of qubits minus a binary logarithm (log2) of a second quantity of non-uniform memory access nodes or wherein the reordering the first qubit with the second qubit comprises minimizing, by the system, an occurrence of one or more control qubits that are lower than a binary logarithm (log2) of a quantity of non-uniform memory access nodes.

16. A computer program product that facilitates improvement of a quantum computing simulation of a controlled NOT gate while avoiding unbalanced memory access of a control qubit, the computer program product comprising a computer readable storage medium having program instructions embodied therewith, the program instructions are executable by a processor to cause the processor to:

select the control qubit and a non-control qubit, wherein the non-control qubit and the control qubit are different qubits;

reorder the control qubit with the non-control qubit;

simulate a controlled NOT gate while the control qubit is reordered with the non-control qubit; and reduce:

control qubits that are equal to or higher than a first quantity of qubits minus a first binary logarithm (log2) of a second quantity of non-uniform memory access nodes; or control qubits that are lower than a second binary logarithm (log2) of a quantity of non-uniform memory access nodes.

\* \* \* \* \*